Nov. 17, 1953     F. E. TUTTLE ET AL     2,659,264
METHOD OF DETERMINING THE VELOCITY AND ACCELERATION
CHARACTERISTICS OF MOVING OBJECTS
Filed April 27, 1950     2 Sheets-Sheet 1
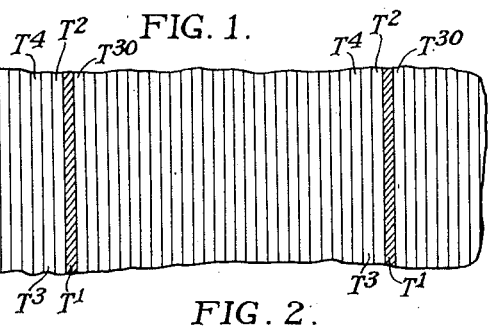
FIG. 1.
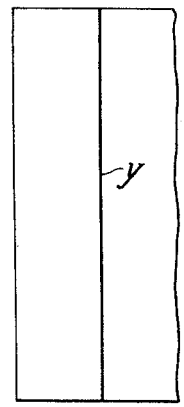
FIG. 6.
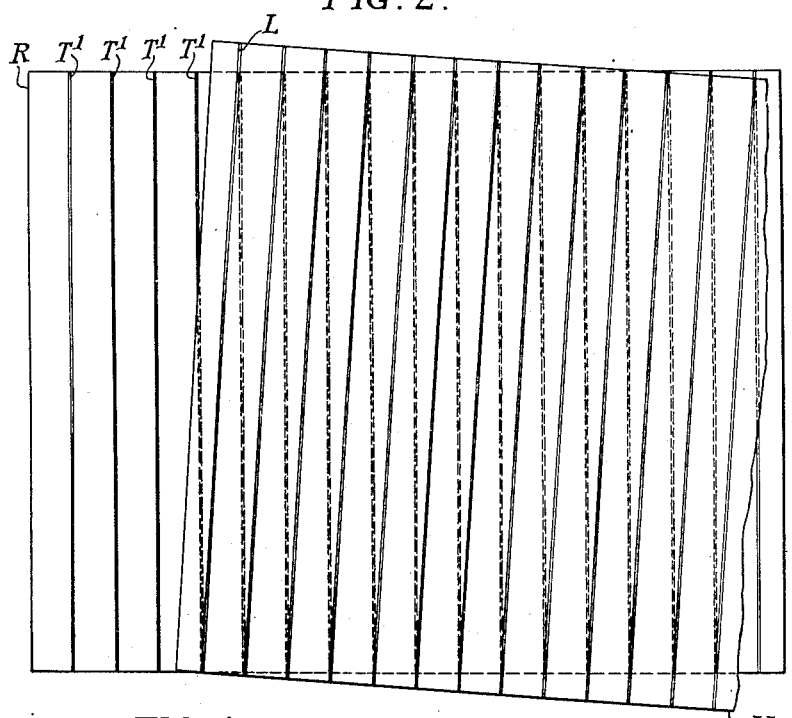
FIG. 2.
FIG. 4.     FIG. 5.
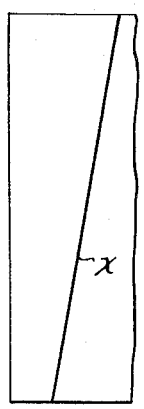
FIG. 3.
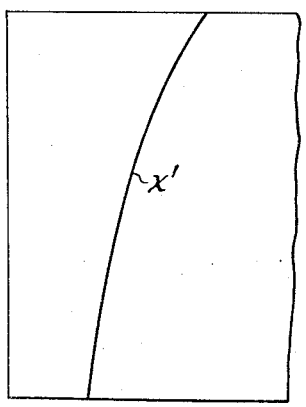
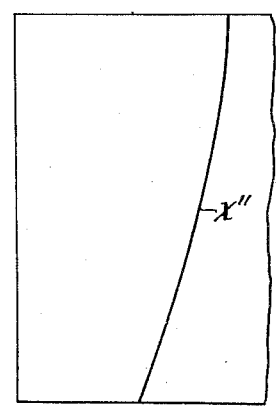
FORDYCE E. TUTTLE
WALTER C. NEWCOMB
INVENTORS
BY
ATTORNEYS

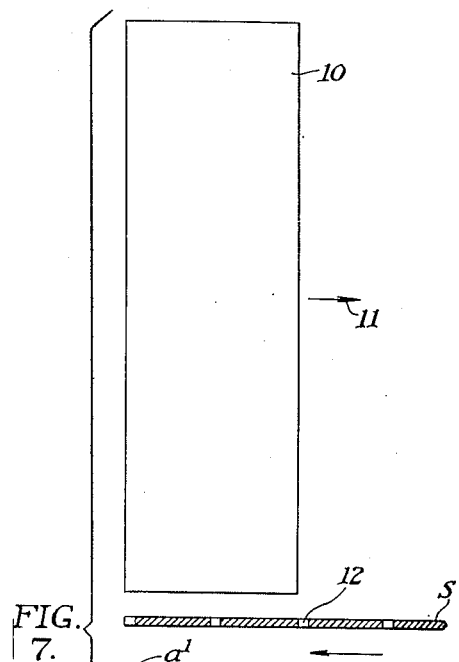
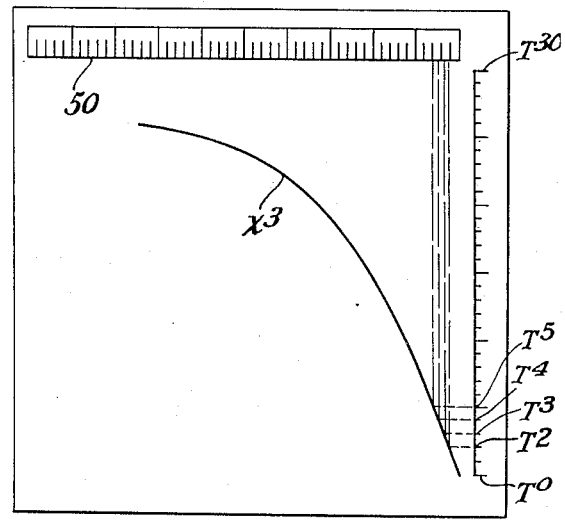
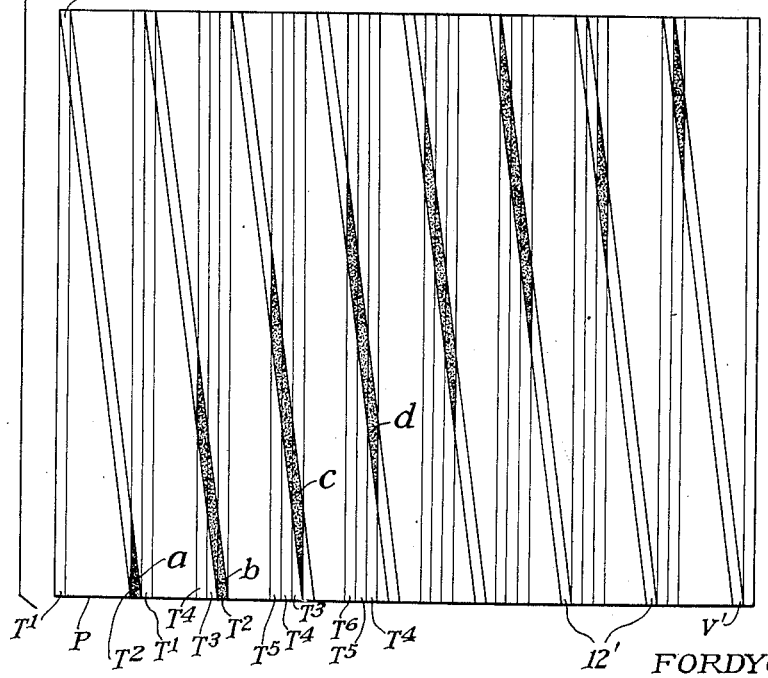
FIG. 7.
FIG. 8.
FORDYCE E. TUTTLE
WALTER C. NEWCOMB
INVENTORS
BY
ATTORNEYS Patented Nov. 17, 1953

2,659,264

UNITED STATES PATENT OFFICE 2,659,264

METHOD OF DETERMINING THE VELOCITY AND ACCELERATION CHARACTERISTICS OF MOVING OBJECTS

Fordyce E. Tuttle and Walter C. Newcomb, Rochester, N. Y., assignors to Eastman Kodak Company, Rochester, N. Y., a corporation of New Jersey Application April 27, 1950, Serial No. 158,619

7 Claims. (Cl. 88—14)

The present invention relates to photography and particularly to a method of photographically determining the velocity and acceleration characteristics of high-speed objects.

One object of the present invention is to provide a new method of determining the velocity and acceleration characteristics of an object having a rectilinear motion.

Another object is to provide a method of determining the velocity and acceleration characteristics of a moving object which involves the use of photography and eliminates the conventional procedure of individually recording displacements against time and plotting the displacement-time and/or velocity-time curves for the object and taking the slopes of these curves to determine the velocity and acceleration characteristics respectively of the object.

A further object is to provide a method of determining the velocity and acceleration characteristics of an object which involves photographically recording the time-displacement characteristics of an object moving with rectilinear motion and observing this photographic record in such a way that the relative displacements of the object during successive equal intervals of time can be observed as a curve which is, in effect, the time-displacement curve of the object.

And yet, another object is to provide a method of determining the velocity and acceleration characteristics of an object moving rectilinearly at high speed which involves photographically recording the object through a lined screen in such a way that a moving picture of the object is obtained on a sensitized surface which comprises adjacent composite type pictures made up of line images of the object and said pictures separated from one another by equal time intervals and observing this record through a lined screen, like that through which the exposure was made, but tilted so that the individual lines thereof span in their length a number of successive line images of the record included between two adjacent simultaneously recorded line component images which are equivalent in time.

And still another object is to provide a method of photographically obtaining the time-displacement curve of a moving object from which the actual values of velocity and acceleration of the object at different points along its path can be obtained, if desired.

The novel features that we consider characteristic of our invention are set forth with particularity in the appended claims. The invention itself, however, both as to its organization and the steps and results involved therein, together with additional objects and advantages thereof, will best be understood from the following description when read in connection with the accompanying drawings, in which Fig. 1 is a diagrammatic illustration, on a greatly magnified scale, of what a composite picture taken through a lined screen might look like when viewed directly, rather than through another lined screen. Obviously, this figure represents only a small portion of a complete photographic record; in fact, only a little more than what is actually contained between two equivalent time images;

Fig. 2 diagrammatically illustrates how the viewing screen is tilted relative to the photographic record made through a similar lined screen in order to obtain a time-displacement curve of the moving object originally photographed on the record;

Figs. 3-6 diagrammatically illustrate how a reference line on the moving object might appear through a tilted lined viewing screen when the object is subject to different types of motion, or no motion at all;

Fig. 7 schematically illustrates the manner in which a photographic record of a moving object is made and viewed through an inclined lined screen according to the present invention, a particularly simple case being assumed in order to illustrate the phenomenon of the present invention; and Fig. 8 schematically illustrates how a space-time curve obtained according to the present invention may be utilized to measure actual values of velocity and/or acceleration of the object at different points in its path of travel.

Like reference characters refer to corresponding parts throughout the drawings.

Our novel method of determining the velocity and acceleration characteristics of a moving object makes use of the application of the multiple line screen principle to high-speed photography, as disclosed in copending U. S. patent application Serial No. 114,352, filed September 7, 1949, now Patent No. 2,578,327, issued December 11, 1951, and of which one of the present inventors is a coinventor. This noted patent application teaches that if a moving object is photographed through a lined screen which is translated to new positions rapidly, a high-speed sequence of motion pictures may be recorded on a sensitized surface, each picture of the sequence being a composite picture made up of a plurality of linear images or elements of the complete picture which, when viewed simultaneously through a lined screen like that through which they were exposed, will appear as one positional image of the moving object. The minimum number of composite pictures that can be made before double exposure is encountered will be determined by the ratio of the width of the transparent and opaque lines of the screen, since at least one new picture will be taken each time the screen is moved a distance equal to the width of its transparent lines and double exposure will occur when a given line has moved a distance such that it will uncover the same area of sensitized surface which was previously uncovered by the line adjacent thereto, and ahead of it in the direction of movement of the screen, which made an exposure which was equivalent in time to that made by the line in question. Actually, the maximum number of different pictures which can be taken on a photographic plate will not bear any relation to the relative widths of the transparent and opaque lines of the screen, but will be determined by the resolving power of the emulsion. This is true because the lines of the screen are moving across the plate continuously during the exposure and thus continuously uncovering new grains of emulsion. This will be appreciated if one remembers that the actual exposure made on the plate is a continuous one and if looked at directly, without looking through a lined screen, would probably appear as a blur or smear on the plate. Now, if the viewing screen is moved only a portion of its transparent line width during viewing, instead of a full line width as is the normal procedure, a new image of the object will be seen which may differ from the previous one if the speed of the object were sufficient to produce a change in this short interval of time.

Any vertical line on an object photographed with a multiple line screen camera will appear as a vertical line when the photographic plate is placed in the proper viewer to be looked at through a lined screen, like that through which it was exposed. If the vertical line was motionless during the sequence of exposures, then it remains motionless as the viewing screen is translated to expose subsequent composite pictures or "frames" of the sequence. If it were moving, the image of the line obviously will move. Assume now, however, that the photographic plate, carrying the composite pictures, or "frames," made up of multiple line images, is viewed through a lined screen, or grid, the line pattern of which is not parallel to the line images of the plate but lies at a small angle to it.

This angle may vary from a maximum, at which point each transparent line on the viewing screen just spans in its length (by virtue of its slope) the distance between two equivalent time images on the plate, to a minimum, where each transparent line on the viewing screen spans in its length only two adjacent time images on the plate.

Under this condition, the image of a moving vertical line will appear to lean sideways. This is true because the tilted viewing screen allows one to look, as the line of sight progresses from the bottom to the top of the plate, at successive adjacent or contiguous "frames" of the picture which differ from their neighbors in a time sense, having been taken either earlier or later, depending upon whether the rotation to produce the screen tilt is clockwise or counterclockwise. This leaning line, therefore, actually represents a time-displacement curve of the moving vertical line and, hence, any object on which the line might be. The amount of lean will depend upon the velocity of the object and the angle of tilt which the viewing screen makes relative to the line images on the photographic plate.

Assuming a uniform velocity for the taking screen or grid, if the object were moving with a constant velocity, the leaning line would appear straight since for each successive "frame" the object moved the same distance in the same time interval. If, however, the object were moving under positive or negative acceleration, then with each successive "frame" the object has moved an increased or decreased distance and the line will appear curved, and the direction of curvature will directly indicate whether the acceleration is positive or negative. Therefore, from the apparent shape of this line image the velocity and acceleration characteristics of the object bearing this line are directly observable. Furthermore, since the image of the reference line is, in fact, a time-displacement curve of the object, the actual measurements of velocity and acceleration of the object can be readily determined therefrom if the dimensions of the taking lined screen and its rate of movement are known.

The first step in carrying out our method is to photograph the moving object, of which the velocity and acceleration characteristics are desired, onto a photographic plate, or other type of sensitized surface, through a lined screen which is moved across, and substantially in contact with, the plane of the photographic plate at a constant or uniform velocity. This screen should have its parallel transparent lines separated by equal distances which is a multiple of the individual width of its transparent lines so that a plurality of composite pictures can be exposed on the plate as the screen moves a distance equal to that between two adjacent lines. Ordinarily, the camera will be so oriented that the screen will move in a plane substantially parallel to that of the object and with the lines of the screen being disposed substantially at right angles to the direction of movement of the object. Any suitable grid-type, high-speed camera can be used to make this exposure; for example, one like that disclosed in the above-noted copending application, so long as the screen is capable of being moved with uniform velocity which is sufficiently great relative to that of the object being photographed as to effectively stop the motion of the object at successive positions in its travel, as will be depicted by successive composite images recorded on a photographic plate.

This exposed photographic plate, when processed to bring out the latent images, will produce a photographic record comprising a plurality of composite images in adjacent relationship, each of which consists of a plurality of spaced linear image elements, or "frames," corresponding in dimension and shape to the lines of the screen; and each composite picture depicting a single position of the object differing from adjacent composite pictures by a given time interval determined by the velocity at which the screen was moved during the exposure. Each composite picture on the plate will be the equivalent of adjacent individual frames in a conventional motion picture film to the extent that it depicts separate positions of the object at different time intervals. Furthermore, since, in the present instance, we are interested in only a reference line on the moving object which is substantially normal to the direction of travel of the object, and this reference line at any one position of the object may be included by only a relatively few of the total number of transparent lines of the screen, each linear image of the photographic record can accurately be referred to as a "frame" of the motion series and will so be referred to for convenience throughout the remainder of this specification and the claims. This reference line on the object which we have referred to above, and which becomes part of the object we use for obtaining the desired displacement time-curve, may be any distinguishable part which is an inherent part of the object, such as the trailing edge of a bullet, the leading edge of a square-ended object, the door-jamb of an automobile, etc., or it may be a special target which is attached to the object for this specific purpose.

The minimum number of different composite pictures which can be exposed on a given photographic plate before double exposure begins will be determined in most instances by the ratio between the width of the lines of the taking screen and the space between each line. In order to have a concrete example to talk about, let us assume that the lined screen has the relative dimensions set forth in the above-noted copending application, by way of example. In this instance, the transparent lines of the screen are each .001" wide and spaced from one another on .030" centers, so that 30 different composite pictures may be recorded on the photographic plate when the screen is moved a distance of .030". Each of these composite pictures will be made up of a plurality of .001" wide linear images spaced .030" apart on the plate, and every thirtieth linear image on the plate will be equivalent time "frames" since they were exposed at the same instant. Each of the 29 linear image elements or "frames" making up parts of the other twenty-nine composite pictures on the plate will represent "frames" separated from the adjacent "frame" by a known time interval dependent upon the velocity of the grid. If, for example, the screen, or grid, is moving at a uniform velocity of 1" per second, it will take 1/1000 of a second for the screen to move the width of one transparent line and the composite pictures or "frames" will be separated by time increments of 1/1000 second. It goes without saying that these exposure speeds could be stepped up considerably without encountering any practical difficulty, but this value of 1" per second movement for the taking screen is being assumed because it is a convenient value to talk about.

In Fig. 1 we have attempted to illustrate what a photographic record might look like when exposed with a taking screen having the assumed dimensions of .001" wide transparent lines spaced on .030" centers. It is pointed out that this figure represents only a small portion of the complete photographic record on a greatly magnified and exaggerated scale. In fact, it shows essentially only two equivalent time frames of several of the 30 pictures which can be recorded on the plate and one time frame of each of the 29 other pictures on the plate. The linear image elements or "frames" designated $T_1$ on the photographic record R will each be .001" in width and spaced from one another on centers .030" apart. Since the two "frames" $T_1$ were recorded at the same time instant, or when the screen was in one particular position, they will represent parts of one composite picture and will be equivalent adjacent time frames. It will be appreciated that each composite picture will actually be made up of many equivalent time "frames" like $T_1$ and, in fact, with the screen dimensions assumed, and considering the photographic plate as being 4" x 5" with the long dimension extending in the direction of screen movement, if the object were of such a size as to completely fill the plate, it would be made up of approximately 165 line images or "frames" like $T_1$.

Now, if we assume that the taking screen was moving across the plate, in the direction as indicated by the arrow in Fig. 1, during the exposure, and the object was moving in the opposite direction, then when the screen moved one line width, or .001", it exposed the equivalent time "frames" $T_2$ which are .030" apart and constitute parts of another composite picture depicting a successive position of the object 1/1000 second later than depicted by the "frames" $T_1$. The screen continues to move, exposing frames $T_2$, $T_3$, $T_4$, . . . at intervals of .001 second until $T_{30}$ is exposed. When the screen has moved this far, the exposure is generally stopped, because any further movement of the screen then starts to again uncover portions of the plate which were previously exposed and double exposure results. Any suitable means can be used to prevent this double exposure; for example, the capping shutter arrangement disclosed in the above-noted copending patent application can be used in conjunction with the taking screen.

Ordinarily, a photographic record made in this manner is viewed through a lined screen exactly like that through which it was exposed, and with the lines of the screen parallel to the "frames" $T_1$, $T_2$, etc. Then, as the screen is moved across the record in the same direction in which it was moved in making the exposure, the "frames" $T_1$ making up one composite picture are all seen at one instant, to the exclusion of all other frames, then all of the frames $T_2$, etc., until the 30 pictures have been looked at in sequence and the object has moved across the field of view.

According to the present invention, the viewing screen is placed over the photographic record R, but it is inclined relative to the "frames" $T_1$, $T_2$, $T_3$, etc., as shown in Fig. 2, the viewing screen being designated as V. The angle of tilt of this viewing screen V relative to the "frames" $T_1$, $T_2$, etc., of the record may vary from a maximum, as indicated in Fig. 2, wherein each transparent line L of the screen just spans in its length (by virtue of its slope) the distance between two adjacent equivalent time images or "frames" $T_1$ of the record plus one of these time "frames," to a minimum, wherein each transparent line L of the viewing screen spans in its length only two adjacent time "frames." Under this condition, the image of a moving vertical reference line on the object will appear to lean sideways. This is true because the tilted screen allows one to look, as one progresses from the bottom to the top of the viewing screen, at successive adjacent "frames" of the record differing from their neighbors in a time sense, having been taken either earlier or later, depending upon whether the rotation to produce the viewing screen tilt is clockwise or counterclockwise.

Let us assume that the object being photographed is a bullet and the reference line under consideration is the trailing edge thereof. If the bullet was traveling to the right and the taking screen to the left, looking at the drawing plane during the exposure, and the viewing screen is tilted clockwise, then if the bullet had uniform velocity over the portion of the path photographed, then the trailing edge of the bullet will appear as a straight line X leaning to the right, as indicated in Fig. 3. In Figs. 3–6 only the reference line of the object is shown, since this is the only part of the object we are interested in, in order to determine the velocity and acceleration characteristics of the object, plus the fact that it would be impossible to depict just what the remainder of the object might look like when viewed through the screen.

If the bullet happened to have positive acceleration during its travel, then its trailing edge would appear curved in the direction as indicated at X' in Fig. 4. On the other hand, if the bullet had a negative acceleration, then the trailing edge would appear curved in the other direction as indicated at X'' in Fig. 5. If there happened to be a stationary object in the field having a vertical reference line associated therewith, it would appear as a straight vertical line when viewed through the tilted grid, as indicated at Y in Fig. 6.

It will thus be seen that our method visually reproduces a reference line on a moving subject in such a way that it represents a time-displacement curve of the reference line and, hence, of the object of which the line is a part, and from which curve the velocity and acceleration characteristics of the moving object can be readily and quickly analyzed. The amount of lean of the line as viewed will depend upon the velocity of the object and the angle of tilt which the viewing screen makes with the photographic plate. However, since the angle of tilt of the viewing screen, as well as the speed of movement of the taking grid during exposure, will be known, the actual value of velocity and acceleration of the object can be readily determined from this curve.

In an effort to more clearly illustrate and describe the phenomenon upon which the present invention is based, we will now refer to Fig. 7 in which we have assumed a simple set of circumstances to illustrate by way of line drawing what takes place in carrying out the present invention. In this figure we have illustrated the object to be photographed as a rectangle which may be white or self-luminous against a dark background, and whose image 10 is formed in the focal plane. We will now assume that the image 10 of this object in the focal plane is moving to the right, as indicated by the arrow 11, with a rectilinear motion and at a uniform velocity. This object will be photographed through a line screen S having a series of equally spaced slits, or transparent lines, 12, which, for purposes of clarity, we have indicated in horizontal cross section and in side-by-side relation to the object. Actually, this screen will be placed substantially in face-to-face contact with the photographic plate and move in a plane substantially parallel to that of the object. Further, let us assume that the screen S moves in a direction opposite to that of the image of the object with a known uniform velocity. We will also assume the height of the object is great enough to expose the full width of the photographic plate, which we have indicated at P, in side-by-side relation with the screen, rather than in superposed relation, as would actually be the case, and has a width such that it will cover two adjacent slits 12 of the screen, while the leading edge thereof just falls short of the third slit 12. In this, the numbering of the slits of the taking screen and of the slits or lines of the viewing screen, and the number of the exposed frames on the photographic record, will be considered as starting with the first at the left, looking at Fig. 7, and numbering upwards as we move to the right.

Now, at the instant the first exposure is made, if the object 10 is disposed relative to the slits 12 of the screen, as shown in Fig. 7, then the trailing edge of the object will be photographed on plate P through the first slit 12 as linear image, or "frame," $T_1$. At the same time, the middle portion of the object opposite the second slit 12 in the screen will be photographed on the plate as another "frame" $T_1$ which is an equivalent time image with that taken through the first slit 12. The remainder of the photographic plate P during this instant will not be exposed because under the dark background circumstances assumed, those areas of the plate behind other slits of the screen at this instant would receive no light, since the object was not in covering relation therewith, whereas the remainder of the plate is protected by the opaque portions of the screen between the slits 12.

Now, let us assume that the object and screen are moving at such relative velocities that by the time the second slit in the screen moves its own width, the trailing edge of the object has moved up to just cover this slit. Now, at this second instant of exposure, the trailing edge of the object is photographed as "frame" $T_2$ on the plate adjacent the second $T_1$ "frame." At the same instant the leading edge of the object will have moved across the third slit in the screen and a second $T_2$ "frame" will have been exposed on the plate P. Inasmuch as during this relative movement of the object and screen the first slit 12 moved off the end of the object, the plate will not be exposed between the first, or left, "frame" $T_1$ and the first, or left, "frame" $T_2$. The distance between the first $T_1$ "frame" and the first $T_2$ "frame" represents the displacement of the trailing edge of the object in one known time travel, or the distance it takes the screen to move one line width.

In the third interval of time, the third slit 12 of the screen will have moved its own width and the trailing edge of the object will have moved up into alignment therewith and a third $T_3$ "frame" will have been exposed on the plate next to the first $T_2$ "frame." At the same instant, the center portion of the object will be in covering relation with the next slit in the screen, and a second equivalent time $T_3$ "frame" will be exposed on the plate at a distance from the first $T_3$ "frame" equal to the spacing between the screen slits 12. This sequence of time "frame" exposures will proceed across the plate as indicated in Fig. 7 until the object moves clear across the plate and successive pairs of time frames $T_4$, $T_5$, $T_6$ . . . will be exposed on the plate. It can thus be seen that the displacement between the first $T_3$ and $T_4$ "frames," between the first $T_4$ and $T_5$ "frames," etc., are the successive displacements made by the object in the time it took the screen to travel successive distances equal to one slit width. Since the widths of the slits 12 in the screen S are equal, and the screen is traveling at uniform velocity, the time interval between each of the exposures is constant. Therefore, if the relative displacement covered by successive or adjacent equivalent time intervals can be compared, then the velocity and acceleration characteristics of the object can be readily visualized.

To do this, we view the photographic record through a screen V' whose transparent lines, or slits, 12' are inclined relative to the photographic record by an amount such that each line 12' of the viewing screen in its length just spans the distance between two adjacent equivalent time images, plus one of the time images of each equivalent pair. Looking at Fig. 7, this means that the inclination of lines 12' of screen V' will be such that one end of the first slit 12' overlaps the upper end of the first time "frame" $T_1$, while the lower end of this same slit will overlap the end of the first time frame $T_2$. It follows then that, as one moves across the record, the inclined slits allow him to look at only portions of successive contiguous time "frames," differing from their neighbors in an equal time sense. Looking at Fig. 7 it will be seen that the first or left slit 12' of the viewing screen V' allows one to see only a small portion of the lower end of the first time "frame" $T_2$ which is shaded and designated $a$, and a small portion of the upper end of the first time frame $T_1$ designated $a'$. The second inclined line 12' intersects the second time "frame" $T_2$ along with time "frames" $T_3$ and $T_4$ so that one would see a portion of the object at the intersection of these three lines indicated by the shaded area $b$. Successive inclined lines 12' of the viewing screen V' will allow observation of different portions of the time "frames" $T_3$, $T_4$, $T_5$ designated by the shaded portion $c$, portions of time "frames" $T_6$, $T_5$, $T_4$ designated by the shaded portion $d$, etc., from the bottom to the top of the record. Inasmuch as in the assumed case the object was traveling at a uniform velocity, the displacements between the successive equivalent time "frames" are equal and the object will appear as a line which is inclined to the right and is straight, the apparition being made up of the shaded portions $a$, $b$, $c$, etc., which will be viewed as a continuous line.

The fact that the line representing the object appears inclined rather than vertical indicates that the object had a velocity. The fact that it appears as a straight line rather than curved shows that its velocity was uniform and that it had no acceleration. If the object had been subject to acceleration, the horizontal spacing between successive shaded areas $a$, $b$, $c$, etc., visible through the screen V' would have increased during successive time intervals and the line would have appeared to curve downwardly as its upper end was approached. By the same token, if the object had negative acceleration, the displacement between successive time "frames" would have become less and less, or more compressed, and the apparent line would have curved at its right, or upper end, in the opposite direction.

While in Fig. 7 the inclined line which one would see as representative of the object is made up of fairly long increments spaced apart horizontally of the record and would probably appear as a series of spaced dashes of considerable width, this is not what will actually appear in a practical case, but is an exaggeration caused by the scale used in the drawing to make the phenomenon apparent. If, as in the condition assumed above, the individual time "frames" $T_1$, $T_2$, $T_3$ etc. are only .001" wide and equivalent time "frames" $T_1$, $T_1$, and $T_2$, $T_2$ are only .030" apart, then each of the intersections of contiguous time "frames" with a slit 12' of the viewing screen V', which is .001" wide, will, in fact, be a point rather than a dash of considerable length, as indicated in Fig. 7. Then, the intersections $a$, $b$, $c$, etc. would appear as white dots on a black background spaced apart by approximately .030" and would appear together as a continuous line of no more than .003" in width. In fact, the line would appear essentially as indicated in Figs. 3–6.

Inasmuch as this curve which is obtained by the present method is, in fact, a time-displacement curve of a moving object, it can be used to obtain the actual measurement of velocity and acceleration of the object in addition to merely indicating the existence and general nature of these characteristics, if so desired. In Fig. 8 we have indicated one way in which the curves could be so utilized. If in addition to the moving object a stationary scale marked in equal increments of any units of displacement and located substantially in the plane of the object is photographed along with the object, then this scale will appear as shown at 50 in Fig. 8, along with the time displacement curve 3 of a reference line on the object. This scale will appear even though the photographic record is viewed through a screen whose lines are tilted relative to the record because the scale is stationary and will appear at all points along the record in the direction of time displacement. Now, if the photographic record was made through a screen whose lines are .001" wide and spaced .030" apart, then the ordinate of the time-displacement curve can be divided into 30 equal intervals of time $T_0$–$T_{30}$, as shown. Knowing the speed of the taking screen, the interval of time between each of points $T_0$–$T_{30}$ would be known and, as above assumed, might be .001"/second. Then, by extending horizontal lines from any of the values $T_0$–$T_{30}$ to the curve and following the vertical from this point of intersection up to the scale, the velocity of the object at that point in its travel would be the distance measured on the scale divided by the value of the time increment under consideration. If the acceleration over a given interval, say between $T_3$ and $T_4$, were desired, it would only be necessary to determine the velocity of the object at these points from the displacement curve, subtract these velocities, and then the average acceleration of the object during the one-second interval between $T_3$ and $T_4$ would be this velocity difference per $\frac{1}{1000}$ second/second. The velocity of $T_3$ can be found by obtaining the points on distance scale 50 corresponding to points $T_2$ and $T_4$ and dividing the difference in these scale readings by .002 which is the time interval between points $T_2$ and $T_4$. Likewise, the velocity at $T_4$ is found by subtracting the scale readings corresponding to points $T_3$ and $T_5$ and dividing by .002.

Rather than having the lines L of the viewing screen V parallel to the end edges and normal to the top and bottom edges of the screen, so as to necessitate tilting the whole viewing screen relative to the photographic record as shown in Fig. 2, the lines could be made on the screen V at the desired angle so that by merely aligning the margins of the record and the viewing screen, the lines of the screen would assume the desired tilt relative to the time "frames" of the record. It is pointed out that the angle of tilt of the lines of the viewing screen relative to the "frame" images of the photographic record can be varied from the maximum value disclosed to a minimum value where in their length the lines only overlap or intersect two contiguous "frames" instead of 30, as in the maximum condition in connection with the above-assumed conditions of the lines being separated on .030" centers when they are each .001" wide. Obviously, the more contiguous "frames" of the record that are intersected by the lines of the viewing screen, the greater the portion of the complete travel of the object that is going to be displayed. In some cases, the relative velocities of the object and the taking screen might be such that only a small portion of the complete travel of the object need be analyzed in order to determine the velocity and acceleration characteristics of the object over that part of its travel which is of interest. In such cases it may be that the lines of the screen need only be inclined or tilted so as to overlap a few contiguous "frames" of the record instead of the maximum number between two adjacent equivalent time images.

Although we have shown and described certain specific embodiments of our invention, we are aware that many modifications thereof are possible. Our invention, therefore, is not to be restricted to the specific details shown and described by way of illustration, but is intended to cover all modifications coming within the scope of the appended claims.

Having thus described our invention, what we claim as new and desire to secure by Letters Patent of the United States is:

1. The method of determining the acceleration characteristics of a moving object to rectilinear motion and having a reference line which is substantially normal with respect to the direction of motion and comprising the steps making a photographic record of the moving object by photographing it on a sensitized surface through a lined screen moved across the focal plane with a uniform velocity, the transparent lines of said screen separated by distances equal to a multiple of the width of said lines whereby the photographic record comprises a series of composite line images of the object each separated by the same time interval and each representing an instantaneous position of the object, superimposing on said photographic record a lined screen like that through which it was exposed, but with the lines thereof inclined to the image elements of said record so that in their length each line overlaps a plurality of adjacent line images but not two adjacent images equivalent in time for the purpose of viewing said reference line on the object for determining whether it appears straight or curved, and if curved, in what direction relative to the direction of movement of the object photographed.

2. The method of determining the acceleration characteristics of a moving object subject to rectilinear motion and having a reference line which is substantially normal with respect to the direction of motion and comprising the steps of making a photographic record of the moving object by photographing it on a sensitized surface through a lined screen which is moved across the focal plane with uniform velocity in a direction substantially parallel to that of the object and substantially at right angles to the lines thereof, said lined screen composed of parallel transparent lines of like width separated by opaque areas whose width is a multiple of the transparent line width whereby the photographic record will comprise a plurality of contiguous line images of different parts of the moving object, each line image differing from its adjacent line image in a time sense and those spaced from each other by the multiple of the line width to the line spacing of the screen being equivalent time images which when viewed simultaneously produce a composite image of the subject at one instant during its movement; superimposing on the front of said record a lined viewing screen like that through which it was exposed, orienting said viewing screen and photographic record so that the lines of said screen are inclined relative to the line images of the record to such an extent that each line of the viewing screen, in its length, overlaps a plurality of contiguous line images disposed between two adjacent line images equivalent in time, for the purpose of determining whether the reference line of the object is straight or curved, and, if curved, in what direction relative to the direction of movement of the object photographed.

3. The method of determining the acceleration characteristics of a moving object subject to rectilinear motion and having a reference line which is substantially normal with respect to the direction of motion and comprising taking a motion picture record of the reference line on a single area of film so that successive "frames" will be a linear image representative of at least a part of the reference line and said "frames" will appear in side-by-side relation corresponding to the direction of movement of said reference line, and each "frame" will represent a single position of the line in its travel and will be separated from its adjacent "frame" by the same time interval, superimposing on said motion-picture record a viewing screen having a plurality of equally spaced elongated narrow slits substantially equal in width to each of said "frames," orienting said viewing screen relative to said record so that said slits are inclined relative to said "frames" and each slit overlaps at least two of said adjacent "frames," whereby upon determining whether said reference line as viewed through said slits appears straight or curved, and, if curved, in what direction relative to the direction of movement of the reference line, the acceleration and velocity characteristics of the object will become known.

4. The method of determining the acceleration characteristics of a moving object subject to rectilinear motion and having a reference line which is substantially normal with respect to the direction of motion, and comprising the steps of photographing said moving object on a frame of light-sensitive material through a lined screen which is moved across the focal plane in a direction substantially parallel to the direction of movement of the subject and normal to the lines thereof, said lined screen made up of transparent lines separated by opaque lines which are wider than the transparent lines by a multiple thereof, whereby the photographic record consists of a series of composite images of the object representing separate positions of the object during its movement and separated from each other by equal time intervals; superimposing on the photographic record a lined screen like that through which it was exposed shifting said lined screen on said record to incline the lines thereof relative to the elemental images of the picture to an extent such that one transparent line of the lined screen will, in its length, overlap at least two adjacent image elements of the composite picture, whereby the reference line on the object is visually reproduced in such a way that it represents a time-displacement curve of the reference line from which the velocity and acceleration characteristics of the moving object can be readily and quickly analyzed.

5. The method of determining the acceleration characteristics of a moving object subject to rectilinear motion and having a reference line which is substantially normal with respect to the direction of motion, and comprising the steps of photographing said moving object on a frame of light-sensitive material through a lined screen which is moved across the focal plane in a direction substantially parallel to the direction of movement of the subject and normal to the lines thereof, said lined screen made up of transparent lines separated by opaque lines which are wider than the transparent lines by a multiple thereof whereby the photographic record consists of a multiplicity of elemental strip images in adjacent relationship which when viewed in selected groups through a lined screen like that through which they were exposed combine to form separate images representative of different positions of the object during its movement; superimposing on that group of elemental strip images of the record including said reference line a narrow lined screen like that through which the object was photographed, and tilting said lined screen relative to said record so that its lines are inclined relative to said elemental strip images and each line thereof overlaps a plurality of adjacent line images of the record in its length; whereby the reference line on the object is visually reproduced in such a way that it represents a time-displacement curve of the reference line from which the velocity and acceleration characteristics of the moving object can be analyzed.

6. The method of graphically illustrating the acceleration and velocity characteristics of a moving object subject to rectilinear motion and having a reference line thereon which is substantially normal to the direction of movement comprising the steps of making a photographic record of the moving object by photographing it on a sensitized surface through a line screen moved across the focal plane with a uniform velocity and in a direction substantially parallel to that of the movement of the object, the lines of said screen separated by a distance equal to a multiple of the width of said lines; placing a viewing line screen, having the same line width and relative line separation as the screen through which the object was photographed, in covering relation with the photographic record but with the lines inclined relative to said record so that in its slope a line of the viewing screen subtends a distance on the record less than that between two adjacent simultaneously exposed line images, and sending light through the combined photographic record and viewing line screen whereby said reference line by its shape will indicate the velocity and acceleration characteristics of the object.

7. The method of obtaining a visual indication of the acceleration and velocity characteristics of a moving object subject to rectilinear motion and bearing a reference line which is substantially normal to the direction of motion comprising the steps of making a photographic record of the moving object by photographing it on a sensitized surface through a lined screen moved across the focal plane with a uniform velocity and in a direction substantially parallel to that of the movement of the object, the transparent lines of said screen separated by a distance equal to a multiple of the width of said lines, superimposing on said photographic record a lined viewing screen which has the same physical dimensions as the screen through which the object was photographed, and orienting said viewing screen relative to said record so that the lines thereof are inclined relative to the linear images making up the record and in its slope a line of the viewing screen subtends a distance on the record less than that between two adjacent line images which are equivalent in time, whereby the apparent disposition and shape of said reference line when viewed through said screen will be indicative of the velocity and acceleration characteristics of the object.

FORDYCE E. TUTTLE.
WALTER C. NEWCOMB.

References Cited in the file of this patent

UNITED STATES PATENTS

| Number | Name | Date |
| --- | --- | --- |
| 1,150,374 | Kanolt | Aug. 17, 1915 |
| 1,260,682 | Kanolt | Mar. 26, 1918 |
| 1,501,842 | Duda | July 15, 1924 |
| 1,946,934 | Dorst | Feb. 13, 1934 |
| 1,950,374 | Kanolt | Mar. 6, 1934 |
| 1,984,004 | Wildhaber | Dec. 11, 1934 |
| 2,259,228 | Rankin | Oct. 14, 1941 |

FOREIGN PATENTS

| Number | Country | Date |
| --- | --- | --- |
| 7,522 | Great Britain | Mar. 31, 1913 |
| 421,120 | Great Britain | Dec. 10, 1934 |